(12) United States Patent
Durstine (10) Patent No.: US 12,490,736 B2
(45) Date of Patent: Dec. 9, 2025

(54) PORTABLE SCENT DIFFUSER DEVICE AND METHOD OF USE THEREOF

(71) Applicant: Robert Durstine, Somerset, PA (US)

(72) Inventor: Robert Durstine, Somerset, PA (US)

( * ) Notice: Subject to any disclaimer, the term of this patent is extended or adjusted under 35 U.S.C. 154(b) by 559 days.

(21) Appl. No.: 18/151,144

(22) Filed: Jan. 6, 2023

(65) Prior Publication Data

US 2023/0232817 A1 Jul. 27, 2023

Related U.S. Application Data

(60) Provisional application No. 63/301,671, filed on Jan. 21, 2022.

(51) Int. Cl.
*A01M 31/00* (2006.01)
*A61L 9/12* (2006.01)

(52) U.S. Cl.
CPC ............. *A01M 31/008* (2013.01); *A61L 9/12* (2013.01)

(58) Field of Classification Search
CPC ........ A01M 31/008; A61L 9/12; A61L 9/127; A61L 2209/15
See application file for complete search history.

(56) References Cited

U.S. PATENT DOCUMENTS 4,374,571 A * 2/1983 Hirvela ..................... A61L 9/12
239/57
9,427,487 B1 * 8/2016 Forbes ...................... A61L 9/12

* cited by examiner

*Primary Examiner* — Blessing M Fubara
(74) *Attorney, Agent, or Firm* — Brennan, Manna & Diamond, LLC (57) ABSTRACT

The present invention relates to a novel scent diffuser device for distributing attractant in desired areas as per preferences of a user for attracting deer or game. The device includes a bottle for storing a liquid attractant and is configured to be sealed by a lid. An internal hemp rope is affixed to an interior of the bottle and extends through the interior of the bottle to connect to the lid. A paracord is attached to the lid for hanging the lid on a fixed surface. When the lid is unscrewed, the bottle and the lid are connected through the hemp rope and the hemp rope absorbs the liquid attractant such that a scent is distributed or diffused from the hemp rope when the lid is unscrewed. The device keeps the liquid attractant inside the bottle when the lid or cap is secured to the bottle.

20 Claims, 5 Drawing Sheets

PORTABLE SCENT DIFFUSER DEVICE AND METHOD OF USE THEREOF

CROSS-REFERENCE TO RELATED APPLICATION

The present application claims priority to, and the benefit of, U.S. Provisional Application No. 63/301,671, which was filed on Jan. 21, 2022, and is incorporated herein by reference in its entirety.

FIELD OF THE INVENTION

The present invention relates generally to the field of scent diffuser devices. More specifically, the present invention relates to a novel scent diffuser device for distributing scent to a desired area when a user chooses to diffuse scent. The device has an internal hemp rope for absorbing liquid scent and distributing same to the desired area. The device enables users to hang and support the device at any desired location via a paracord. Accordingly, the present disclosure makes specific reference thereto. Nonetheless, it is to be appreciated that aspects of the present invention are also equally applicable to other like applications, devices, and methods of manufacture.

BACKGROUND

By way of background, animal hunters and outdoorsmen generally use different types of baits to attract animals to a certain hunting or feeding site. Many individuals like to hunt deer, and for attracting deer, individuals may sprinkle or distribute scent to attract deer. Scent devices are used by hunters for luring a desired game while also masking undesirable odors. However, standard scent diffuser devices are ineffective in releasing scent and may continue to release scent even when not required, thus, causing wastage of the scent. In many cases, the scent evaporates quickly due to being continuously exposed to the air.

Now-a-days, modern diffusers are provided that are configured to release scent on a certain frequency. However, such diffusers also cause wastage of scent as after luring a game, scent may not be required but the diffusers continue to dispense scent in the form of mist. Individuals desire an improve scent diffuser device that diffuses scent only when desired by a user, for example a hunter.

Conventional ways of luring deer or game by placing a food plot near a hunting blind is also common. However, a hunter may not be able to readily see a deer in portions of the food plot and therefore, may miss an unobstructed shot at the game.

Many scent diffuser devices are required to be placed on the ground or a surface, or are required to be held by a user for operation. Placement near or on the ground of such devices limit the scope or coverage to which the scent diffuses. Further, the device may not be visible to the deer from a long distance.

Therefore, there exists a long-felt need in the art for a scent diffuser device that effectively lures deer (i.e., deer attractant) to a hunting site. There is also a long-felt need in the art for an improved scent diffuser device that can be hung and supported at any desired location such as branch of a tree. Additionally, there is a long-felt need in the art for a novel scent diffuser device that prevents wastage of scent and saves money of a user. Moreover, there is a long-felt need in the art for a scent diffuser device that eliminates use of food plots for luring deer or game to a hunting place. Further, there is a long-felt need in the art for a portable scent diffuser device that seals the scent inside a container when not required. Furthermore, there is a long-felt need in the art for a scent diffuser device that distributes the scent to a desired area even up to a long distance. Finally, there is a long-felt need in the art for an improved scent diffuser device that releases the scent only when a user chooses to diffuse it by opening a lid of the device.

The subject matter disclosed and claimed herein, in one embodiment thereof, comprises a portable scent diffuser for selectively diffusing a scent around a target area to attract deer. The diffuser comprises a plastic bottle, a plastic lid and a hemp rope connecting the interior of the bottle and the lid, wherein the hemp rope extends through inside of the bottle. The bottle stores a liquid scent and the hemp rope is configured to absorb the stored scent solution. The bottle has a top threaded portion for securing the lid enabling the lid to seal the bottle and when the lid is unscrewed, a portion of the hemp rope is extended out of the bottle such that the scent absorbed in the portion of the exposed hemp rope is diffused to distribute the scent. The device further has a paracord attached to an exterior of the lid for hanging the device to a branch of a tree enabling the device to be hung with the lid unscrewed.

In this manner, the portable scent diffuser device of the present invention accomplishes all of the forgoing objectives and provides users with a portable scent diffuser featuring an internal hemp rope used to distribute scent. The device distributes the scent to a desired area and keeps the scent inside the bottle when the lid or cap is closed, only releasing the scent when a user chooses to open the cap/lid. A paracord of the device enables a user to hang and support the device at any desired location without necessarily keeping it on a floor.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a portable scent diffuser for selectively diffusing a scent to attract deer to a hunting location/area. The diffuser comprises a bottle, a lid/cap and a hemp rope configured to connect the interior of the bottle and the lid, wherein the hemp rope extends through the inside the bottle. The bottle is configured to store scent solution and the hemp rope is configured to absorb the stored scent solution. The bottle has a top threaded portion for engaging with the lid/cap enabling the lid to seal the bottle and when the lid is unscrewed, a portion of the hemp rope is extended out of the bottle such that the scent absorbed in the exposed portion of the hemp rope is diffused to distribute the scent. The device further has a paracord attached to an exterior of the lid for hanging the device to a branch of a tree enabling the device to be hung with the lid unscrewed.

The subject matter disclosed and claimed herein, in one embodiment thereof, comprises a scent diffuser device for attracting animals to a hunting site. The device is a portable device including a plastic bottle and a lid, the lid is screwed to a threaded portion positioned at the top end of the bottle to seal the bottle, the bottle is configured to store liquid scent, an internal hemp rope at one end is attached or affixed to the bottom or interior of the bottle and at another end is coupled to the lid, the rope absorbs the liquid scent and distributes same to a target area when the lid is unscrewed. A paracord attached to an exterior of the lid is configured to connect to a clip (i.e. scissor spring clip) for hanging the device from a branch of a tree.

In another aspect of the present invention, a method for dispensing scent for luring deer or game to a site is described. The method includes the steps of providing a scent diffuser device, the diffuser device has an internal hemp rope for absorbing liquid scent stored in a bottle and the rope diffuses the scent when the lid of the device is unscrewed from the bottle; storing liquid scent inside the bottle or container; unscrewing the lid to take out a portion of the rope from the bottle; hanging the device; and, screwing the lid to seal the bottle.

In yet another embodiment, the scent diffuser device of the present invention is easily and efficiently manufactured, marketed, and available to consumers in a cost-effective manner.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

The innovation is now described with reference to the drawings, wherein like reference numerals are used to refer to like elements throughout. In the following description, for purposes of explanation, numerous specific details are set forth in order to provide a thorough understanding thereof. It can be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments can be combined.

As noted above, there is a long-felt need in the art for a scent diffuser device that effectively lures deer (i.e., deer attractant) to a hunting site. There is also a long-felt need in the art for an improved scent diffuser device that can be hung and supported at any desired location such as branch of a tree. Additionally, there is a long-felt need in the art for a novel scent diffuser device that prevents wastage of scent and saves money of a user. Moreover, there is a long-felt need in the art for a scent diffuser device that eliminates use of food plots for luring deer or game to a hunting place. Further, there is a long-felt need in the art for a portable scent diffuser device that seals or contains the scent inside the bottle/container when not required. Furthermore, there is a long-felt need in the art for a scent diffuser device that distributes the scent to a desired area even up to a long distance. Finally, there is a long-felt need in the art for an improved scent diffuser device that releases the scent only when a user chooses to diffuse it by opening the lid of the device.

The present invention, in one exemplary embodiment, is a scent diffuser device for attracting animals to a hunting site. The device is a portable device including a bottle (i.e., plastic or glass bottle) and a lid/cap, the lid is screwed to a threaded portion positioned at the top end of the bottle to seal the bottle, the bottle is configured to store liquid scent, an internal hemp rope at one end is attached or affixed to the bottom end of the bottle and at another end is coupled to the lid, the rope absorbs the liquid scent and distributes same to a target area when the lid is unscrewed. A paracord attached to the lid is configured to connect to a spring clip for hanging the device from a branch of a tree.

Figure 1:
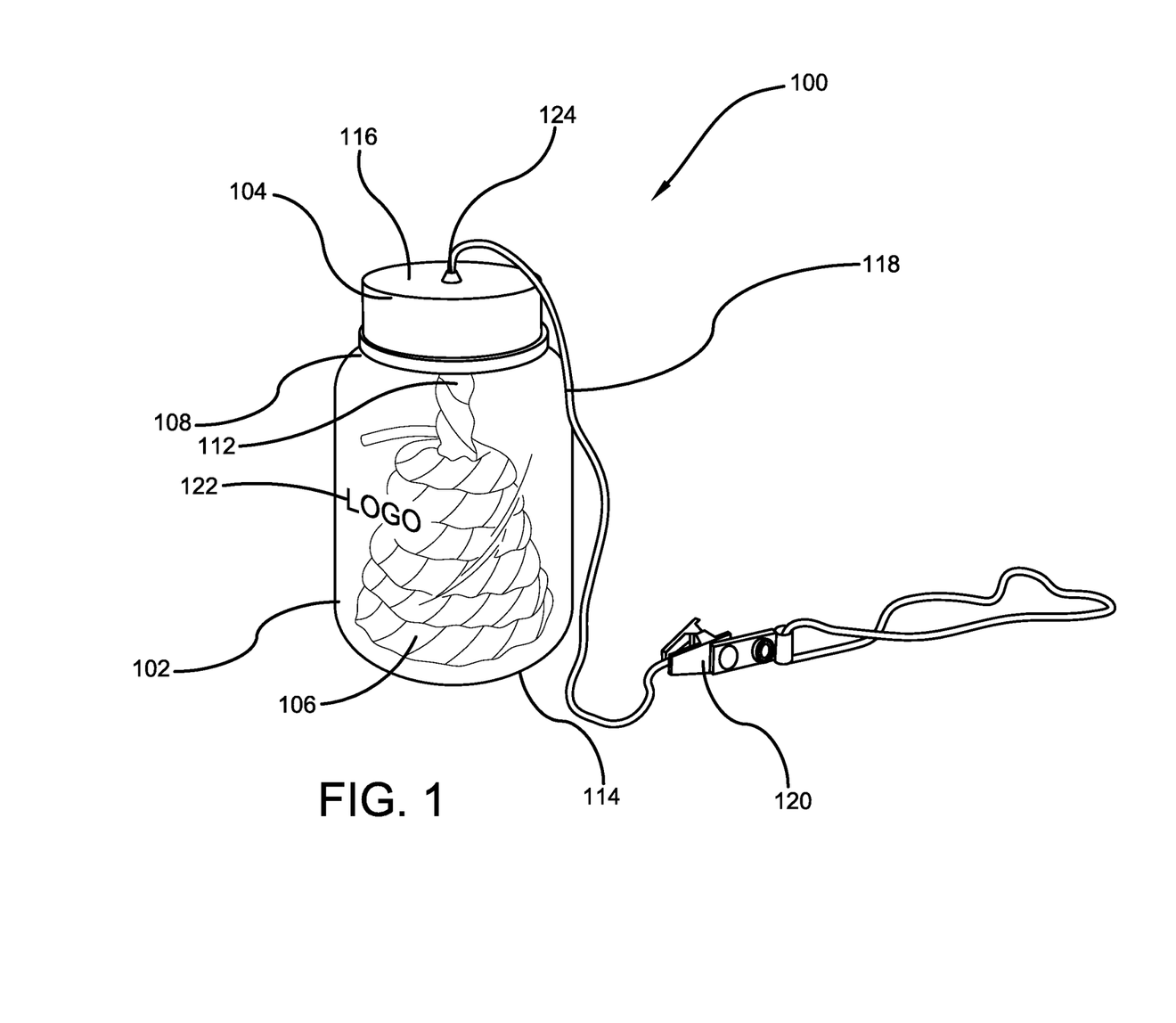
FIG. 1 illustrates a perspective view of one potential embodiment of a portable scent diffuser device of the present invention in accordance with the disclosed architecture.

Referring initially to the drawings, FIG. 1 illustrates a perspective view of one potential embodiment of a portable scent diffuser device of the present invention in accordance with the disclosed architecture. The portable scent diffuser device 100 of the present invention is designed in the form of a bottle or container for storing a desired scent that is diffused to a desired location for luring deer or game. More specifically, the device 100 includes the bottle 102 and a lid 104. The lid 104 is configured to seal the bottle 102 for preventing the stored scent 106 from diffusing or evaporating.

Figure 2:
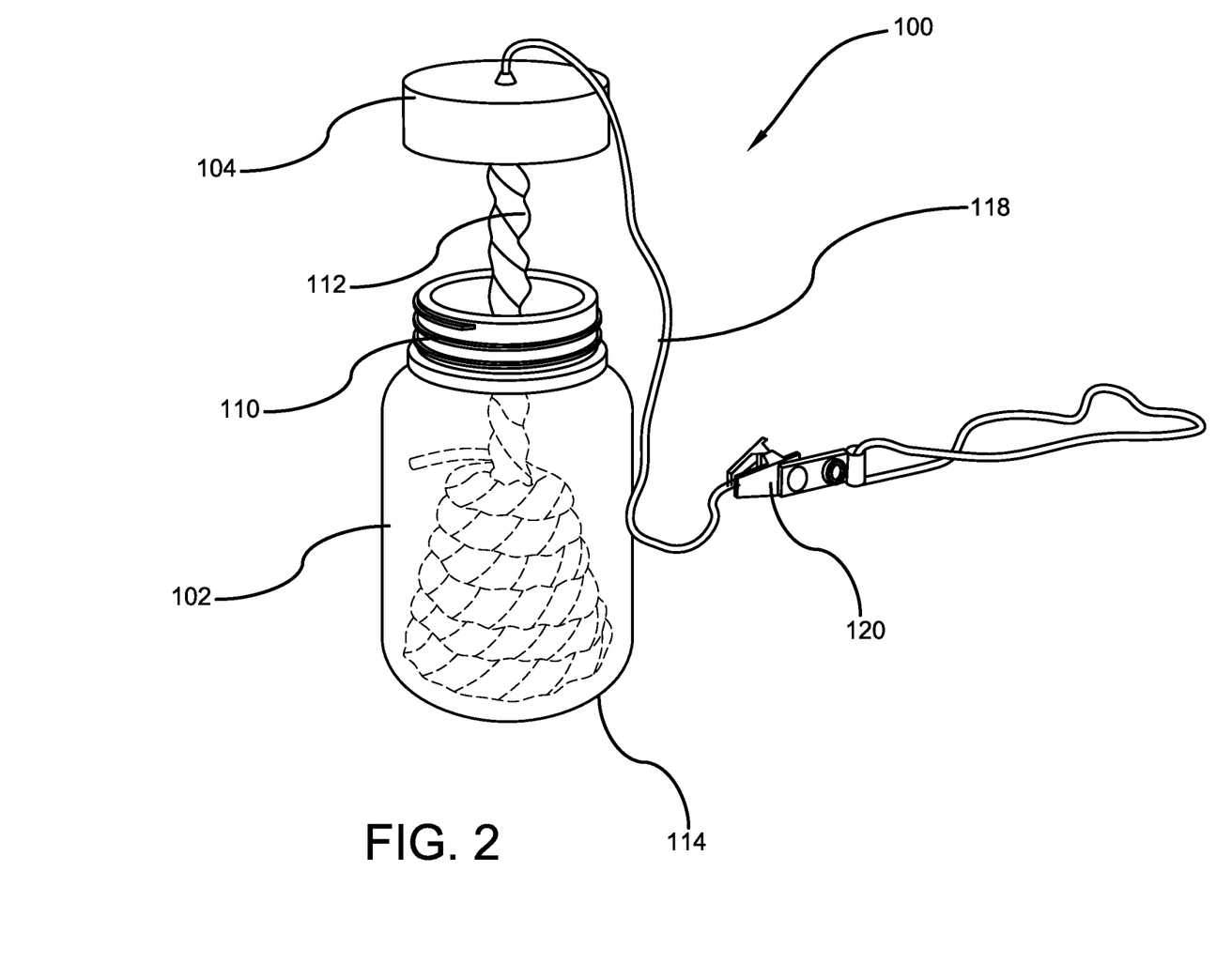
FIG. 2 illustrates a perspective view showing the scent diffuser device with the lid unscrewed for diffusing scent in accordance with the disclosed architecture.

The top end 108 of the bottle 102 has a threaded structure or male threads 110 as illustrated in FIG. 2 to which the lid 104 is secured and to seal the bottle 102 therewith. The lid 104 has ridges or female threads located around the inner surface thereof that are engaged with the threaded structure or male threads 110 of the bottle 102. The device 100 has an internal hemp rope 112 that extends from the bottom 114 of the bottle 102 and connects to the top surface 116 of the lid 104. As a result, the lid 104 and the bottle 102 are connected using the hemp rope 112. The hemp rope 112 is highly absorbent, has excellent wicking properties, is immersed in the stored scent 106 and therefore, enables more scent to be absorbed and emitted during diffusion when the lid 104 is opened or unscrewed.

Figure 3:
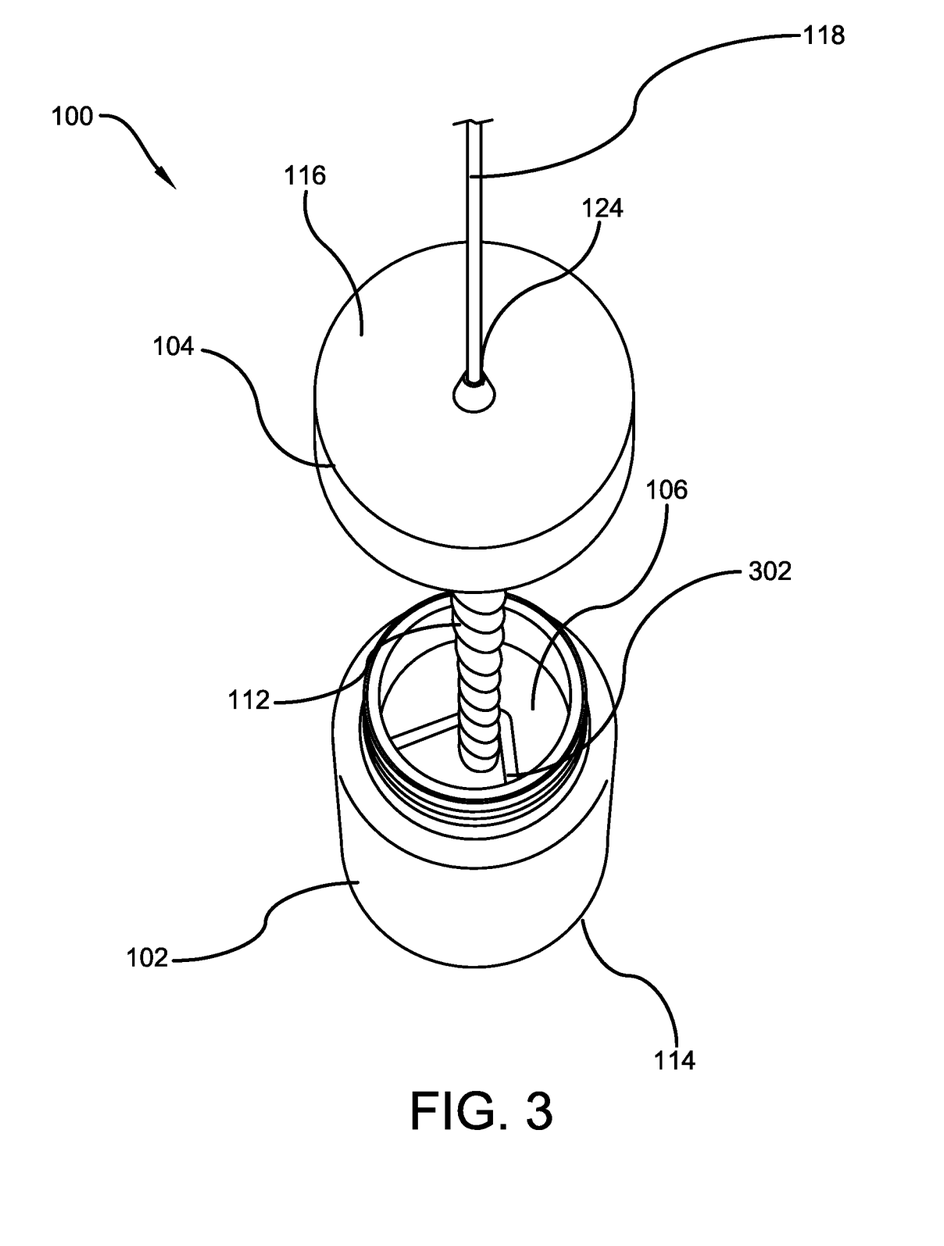
FIG. 3 illustrates a top perspective view of the scent storing bottle of the scent diffuser device of the present invention in accordance with the disclosed architecture.

The hemp rope 112 can be attached, affixed, or retained to the bottom 114 of the bottle 102 using a rigid wire as illustrated in FIG. 3 and can be removed for replacing with a new hemp rope as per preferences of a user. For secure placement and hanging of the device 100 such as on a branch of a tree, a lightweight nylon paracord 118 is attached to the top surface 116 of the lid 104. The paracord 118 can be connected to a conventional spring clip 120 or any other clipping mechanism for securely hanging the device 100 at a desired position. Both the rope 112 and the paracord 118 are fastened to a hole 124 disposed on the center of the lid 104 for a secure fastening and connection to the lid 104.

Advantageously, the scent absorbed by the hemp rope 112 is diffused to the surrounding environment when the lid 104 is opened. The bottle 102 can have a storage capacity from about 80 ml to about 180 ml in different embodiments of the present invention. Also, the bottle 102 is preferably made from lightweight plastic or alternatively can be made from glass, steel, aluminum, or wood. The bottle 102 is refillable with scent thereby enabling the users to use the device 100 in a touchless manner ensuring scent-free hands of a hunter or outdoorsman.

In the preferred embodiment, the hemp rope 112 is from about 4" to about 32" in length and the paracord 118 is reflective enabling users and deer to view the device 100 from long distances. A logo or any other indicia 122 can be disposed on the bottle 102 for marketing and branding purposes. The logo 122 may comprise any insignia, badge, emblem, decoration, alphanumeric symbol, or artistic rendition that will adhere, either permanently or removably, to the bottle 102.

FIG. 2 illustrates a perspective view showing the scent diffuser device with the lid unscrewed for diffusing scent in accordance with the disclosed architecture. As illustrated in the present embodiment, the lid 104 is unscrewed or in an open position which is achieved by unscrewing the lid 104 to disengage from the threaded structure or male threads 110 of the bottle 102. As the lid 104 is opened, a portion of the hemp rope 112 extends out of the bottle 102 such that the scent absorbed by the hemp rope 112 is diffused in the surrounding environment for luring deer or game.

Figure 4:
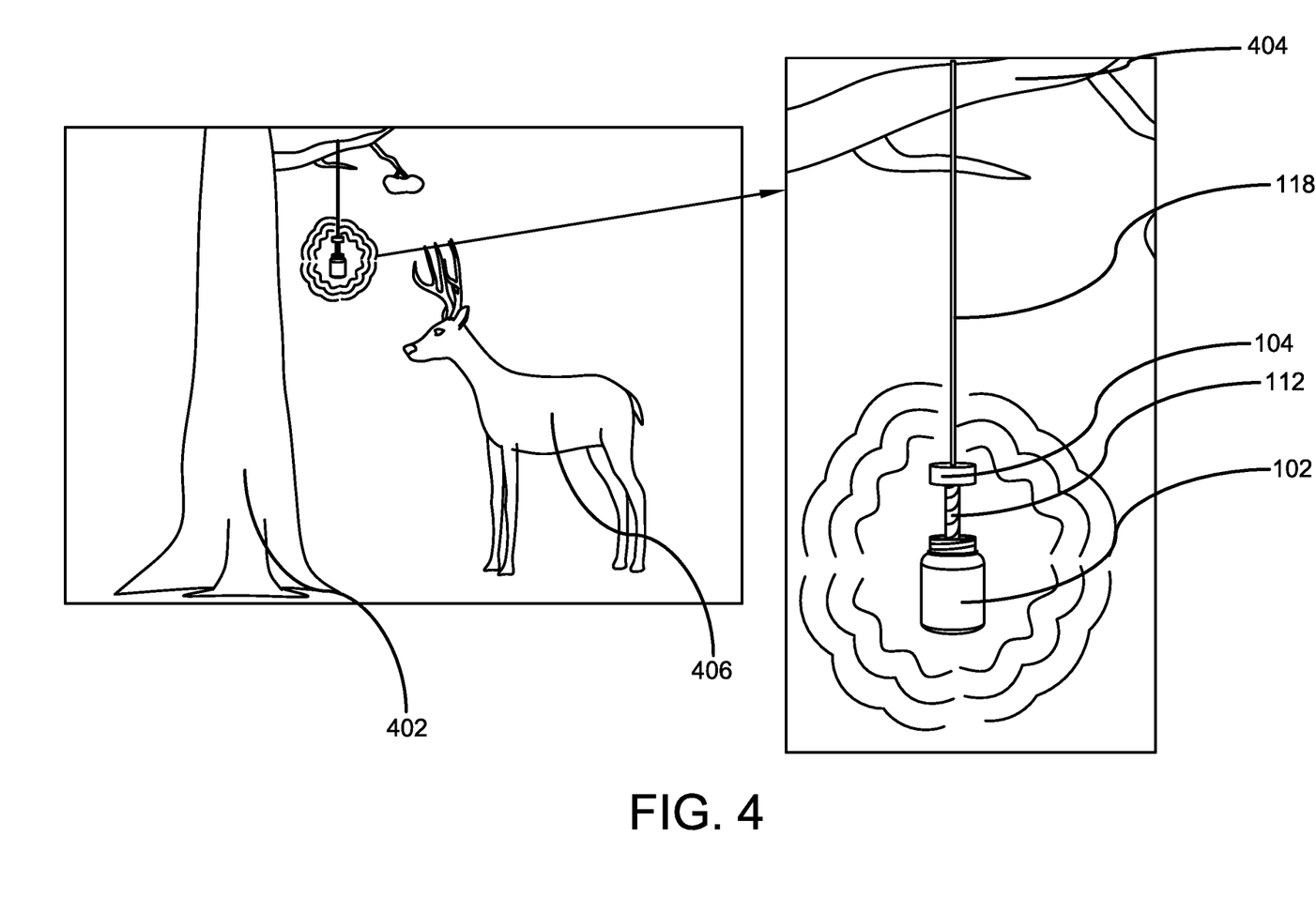
FIG. 4 illustrates a perspective view showing the scent diffuser device of the present invention being hung in the open in an unscrewed orientation for diffusing scent in accordance with the disclosed architecture.

When the lid 104 is opened, the hemp rope 112 remains attached or affixed to both the lid 104 and the bottom 114 of the bottle 102, thereby maintaining a secured connection between the bottle 102 and the lid 104. As a result, when the device 100 is hung using the paracord 118, the bottle 102 does not fall and remains secured using the hemp rope 112 as illustrated in FIG. 4. The rope 112 can be positioned in an extended manner inside the bottle 102 or alternatively may also be rolled or coiled inside the bottle 102 for effective absorption of the scent stored inside the bottle 102.

FIG. 3 illustrates a top perspective view of the scent storing bottle 102 of the scent diffuser device 100 of the present invention in accordance with the disclosed architecture. The bottle 102 is configured to store scent that can be absorbed by the hemp rope 112 and diffused therefrom when the lid 104 of the device 100 is opened. The hemp rope 112 is secured to the bottom 114 of the bottle 102 using a rigid wire 302. The rigid wire 302 does not allow the hemp rope 112 to detach from the bottom 114, or pull out of an interior of the bottle 102, thereby enabling the bottle 102 to hang securely when the device 100 is hung in an open position with the lid 104 unscrewed from the bottle 102.

FIG. 4 illustrates a perspective view showing the scent diffuser device of the present invention being hung in an open or unscrewed orientation for diffusing scent in accordance with the disclosed architecture. For diffusing scent from the bottle 102 via the hemp rope 112, the lid 104 is unscrewed and opened enabling a portion of the hemp rope 112 to be exposed of extended out from the bottle 102 such that the scent absorbed in the hemp rope 112 is diffused to the desired surrounding location. The device 100 is hung in a desired place such as a branch 404 of a tree 402 using the paracord 118.

Advantageously, the deer attracting scent diffuser device 100 can be hung at a height not reachable to a deer 406 enabling a user to always protect the device 100 from any physical damage. During hanging, the paracord 118 supports the lid 104 and the rope 112 interconnecting the bottle 102 and the lid 104 enables the bottle 102 to hang without any fear of falling. Further, the scent stored inside the bottle 102 is not evaporated or diffused but the scent absorbed by the hemp rope 112 is diffused. In one exemplary embodiment, the hemp rope 112 absorbs from about 80% to about 85% of the scent material stored inside the bottle 102.

It should be noted that hemp rope can be used because of its high absorbing capacity and its high tensile strength thereby enabling the rope 112 to support the bottle 112 filled with the scent material. Hemp rope 112 further does not get out of the shape and is non-stretching. The hemp rope 112 can be made from the fibers of the hemp plant.

Figure 5:
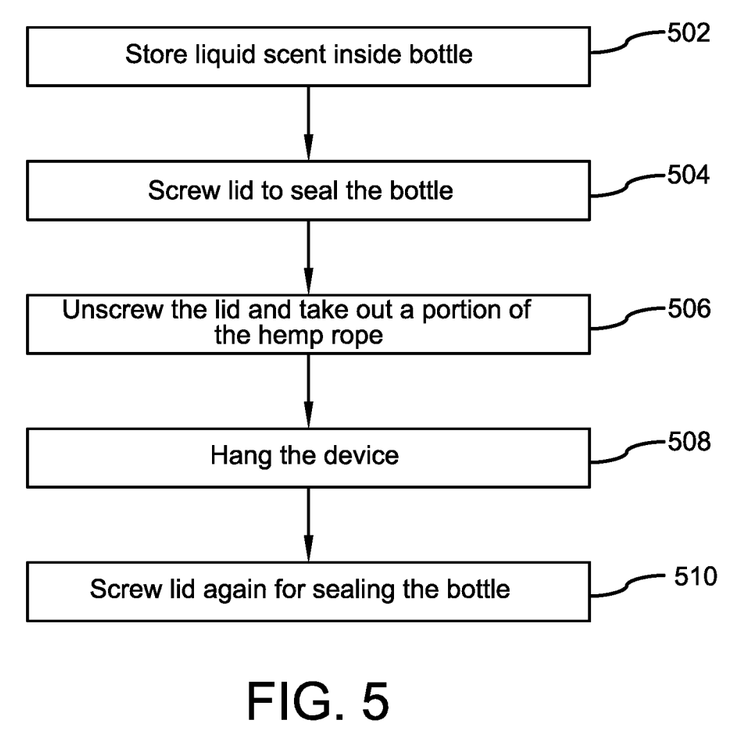
FIG. 5 illustrates a flow diagram depicting a process of use of the deer attracting scent diffuser device of the present invention in accordance with the disclosed architecture.

FIG. 5 illustrates a flow diagram depicting a process of use of the deer attracting scent diffuser device 100 of the present invention in accordance with the disclosed architecture. Initially, a desired scent solution is stored inside the storage bottle 102 (Step 502). For storing the scent, the lid is opened by turning the lid to disengage from the threaded end of the bottle. Then, the lid 104 is screwed to seal the bottle and for enabling the hemp rope to absorb the scent (Step 504). Preferably, the hemp rope absorbs the scent in about an hour for effective absorption.

Thereafter, for diffusing scent, the lid 104 is unscrewed and a portion of the hemp rope is taken out (i.e., exposed) from the bottle 102 (Step 506). Finally, for effective scent diffusing, the device 100 is kept on an appropriate surface or hung on a branch of a tree (Step 508). It should be appreciated that the scent is diffused only when the lid is unscrewed by a user and therefore, prevents unnecessary diffusion and wastage of scent. Finally, once the use is complete, the lid is screwed again to seal the bottle and to stop diffusion of fragrance (Step 510).

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "portable scent diffusing device", "scent diffusing device", "portable scent diffuser", "device", and "deer attracting scent diffuser device" are interchangeable and refer to the portable scent diffuser device 100 of the present invention.

Notwithstanding the forgoing, the portable scent diffuser device 100 of the present invention can be of any suitable size and configuration as is known in the art without affecting the overall concept of the invention, provided that it accomplishes the above stated objectives. One of ordinary skill in the art will appreciate that the portable scent diffuser device 100 as shown in the FIGS. are for illustrative purposes only, and that many other sizes and shapes of the portable scent diffuser device 100 are well within the scope of the present disclosure. Although the dimensions of the portable scent diffuser device 100 are important design parameters for user convenience, the portable scent diffuser device 100 can be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A portable scent diffuser device comprising:
    a portable scent diffuser having a container, a detachable lid, a hemp rope, a cord, a clip, and a liquid scent;
    wherein said liquid scent is stored in said container;
    wherein said hemp rope at a first end is affixed to a bottom of said container and wherein said hemp rope at a second end is attached to an interior of said lid;
    wherein said cord at a first end attached to an exterior of said lid and wherein said cord at a second end attached to said clip;
    wherein said clip attachable to an object for hanging of said portable scent diffuser; and
    further wherein said lid detachable from said container for exposing a section of said hemp rope absorbed with said liquid scent for diffusing a scent therearound while said portable scent diffuser is hung from the object.

2. The portable scent diffuser of claim 1, wherein said liquid scent is a deer attractant.

3. The portable scent diffuser of claim 2, wherein said lid having female threads and a top of said container having male threads for sealing said lid to said container.

4. The portable scent diffuser of claim 3, wherein said hemp rope is immersed in said liquid scent when said lid is sealed to said container.

5. The portable scent diffuser of claim 4, wherein said clip is a spring clip.

6. The portable scent diffuser of claim 5, wherein said first end of said hemp rope having a rigid wire for removable retainment of said hemp rope inside said container.

7. The portable scent diffuser of claim 6, wherein said cord is a paracord.

8. The portable scent diffuser of claim 6, wherein said lid having a hole therethrough including said hemp rope and said cord attached thereto.

9. The portable scent diffuser of claim 1, wherein said hemp rope absorbs said scent.

10. The portable scent diffuser of claim 9, wherein said container having a capacity from about 80 ml to about 180 ml.

11. The portable scent diffuser of claim 10, wherein said container is selected from a material consisting of a plastic, a glass, a steel, an aluminum and a wood.

12. The portable scent diffuser of claim 11, wherein said hemp rope having a length from about 6" to about 10".

13. The portable scent diffuser of claim 12, wherein said cord is reflective.

14. A portable scent diffuser device comprising:
    a portable scent diffuser having a container, a detachable lid, a hemp rope, a cord, a clip, and a liquid attractant;
    wherein said liquid attractant is stored in said container;
    wherein said liquid attractant is a deer attractant;
    wherein said hemp rope at a first end is affixed to a bottom of said container and wherein said hemp rope at a second end is attached to an interior of said lid;
    wherein said hemp rope is immersed in said liquid attractant for absorbing said liquid attractant when said lid is sealed to said container;
    wherein said cord at a first end attached to an exterior of said lid and wherein said cord at a second end attached to said clip;
    wherein said clip attachable to an object for hanging of said portable scent diffuser; and
    further wherein said lid detachable from said container for exposing a section of said hemp rope absorbed with said liquid attractant for diffusing a scent therearound while said portable scent diffuser is hanging from the object.

15. The portable scent diffuser of claim 14, wherein said first end of said hemp rope having a rigid wire attached thereto for removable retainment of said hemp rope inside said container.

16. The portable scent diffuser of claim 15, wherein said cord is a reflective paracord.

17. A method of attracting deer with an attractant, the method comprising the steps of:
    providing a portable scent diffuser having a container, a detachable lid, a hemp rope, a cord, a clip, and a liquid deer attractant;
    retaining said hemp rope at a first end to an interior of said container;
    affixing said hemp rope at a second end to an interior of said lid;
    filling said container with said liquid deer attractant;
    immersing said hemp rope in said liquid deer attractant for absorbing said liquid deer attractant;
    attaching said cord at a first end to an exterior of said lid;
    attaching said cord at a second end to said clip;
    attaching said clip to an object;
    hanging said portable scent diffuser from the object; and
    detaching said lid from said container for exposing a section of said hemp rope absorbed with said liquid deer attractant for diffusing a scent therearound while said portable scent diffuser is hanging from the object.

18. The method of attracting deer of claim 17, further comprising a step of attaching said lid to said container for sealing said hemp rope in said container to prohibit diffusing of said scent.

19. The method of attracting deer of claim 18, wherein said first end of said hemp rope having a rigid wire attached thereto for removable retainment of said hemp rope inside said container.

20. The method of attracting deer of claim 19, wherein said cord is a reflective paracord.

* * * * *